Feb. 5, 1946.   F. W. SCHWINN   2,394,112
FREEWHEELING DEVICE
Filed June 15, 1944   2 Sheets-Sheet 1

Feb. 5, 1946. F. W. SCHWINN 2,394,112
FREEWHEELING DEVICE
Filed June 15, 1944   2 Sheets-Sheet 2

Inventor
Frank W. Schwinn
By McCaleb, Wendt & Dickinson
attorneys

Patented Feb. 5, 1946

2,394,112

UNITED STATES PATENT OFFICE 2,394,112

FREEWHEELING DEVICE

Frank W. Schwinn, Chicago, Ill.

Application June 15, 1944, Serial No. 540,377

3 Claims. (Cl. 192—64)

The present invention relates to freewheeling devices, and is particularly concerned with freewheeling devices adapted to be used upon bicycles and various other types of cycles.

One of the objects of the invention is the provision of an improved freewheeling device of the type adapted to be used with a plurality of sprockets in which the construction is so improved that the size may be materially reduced and a relatively smaller sprocket, such as, for example, a fourteen tooth sprocket, may be mounted upon it.

Another object of the invention is the provision of an improved construction for freewheeling devices in which the sprocket support is self-tightening, but the sprockets are provided with an improved means for mounting so that they can readily be removed and the gear ratio can be changed by varying the size of sprocket with a minimum amount of time and effort.

Another object of the invention is the provision of an improved freewheeling device having a minimum amount of friction and having provision for mounting a multiplicity of sprockets and also provided with suitable means for retaining the grease in the device for lubricating both the main bearings and the freewheeling bearings of the device.

Another object of the invention is the provision of an improved freewheeling device for cycles which is simple in construction, adapted to be manufactured at a minimum cost, and sturdy, so that it may be used for a long period of time without necessity for repair or replacement of any of its parts.

Other objects and advantages of the invention will be apparent from the following description and the accompanying drawings, in which similar characters of reference indicate similar parts throughout the several views.

Referring to the drawings, of which there are two sheets,

Figure 1:
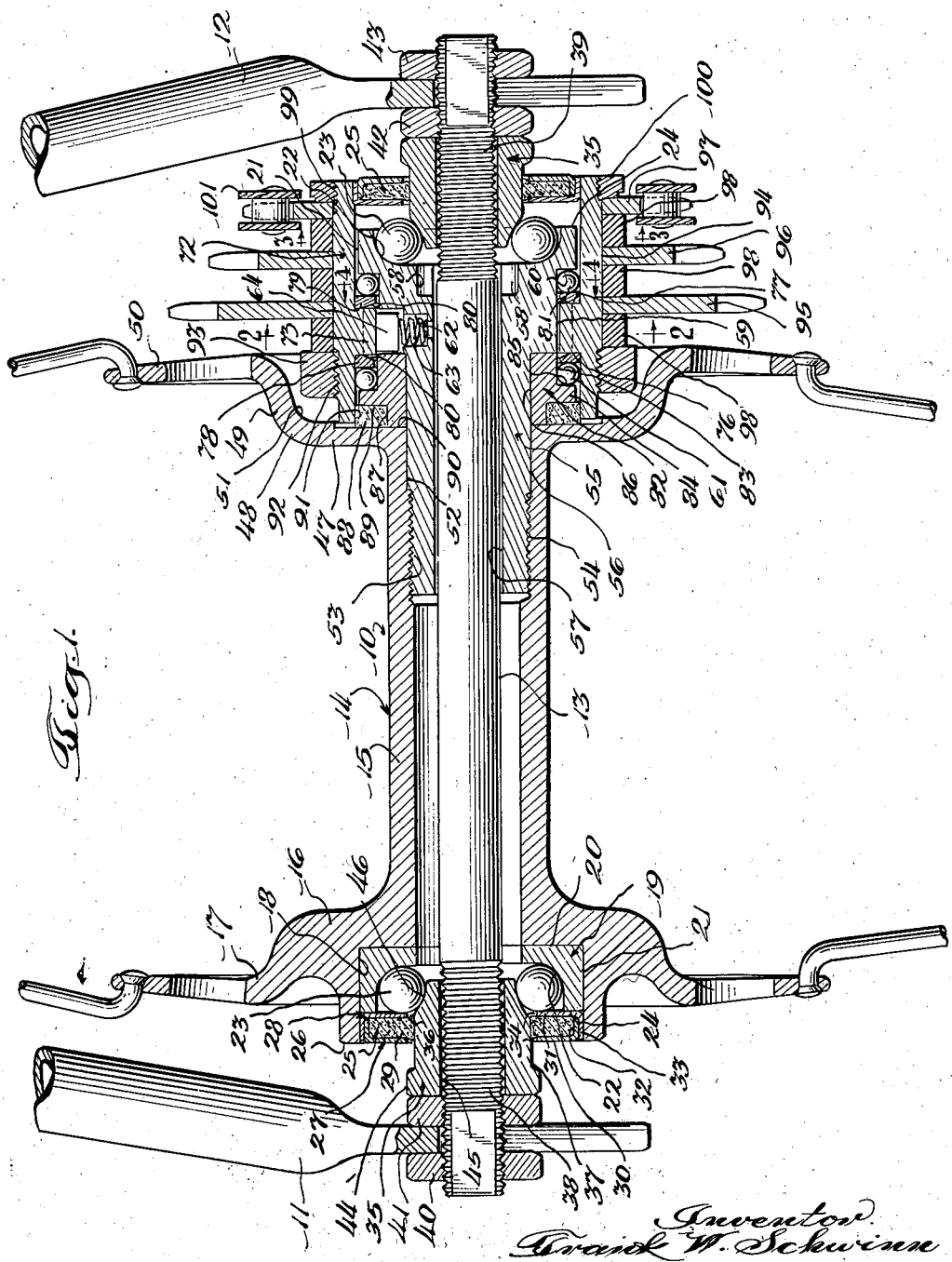
Fig. 1 is a fragmentary sectional view, taken upon a line passing through the axis of the wheel shaft, showing the details of construction of my improved freewheeling device.

Referring to Fig. 1, 10 indicates in its entirety the freewheeling device, which is shown in connection with the rear fork of a bicycle, the two branches of the fork being indicated by 11 and 12 and the shaft by the numeral 13.

The hub of the wheel preferably comprises a metal member 14 having a tubular body portion 15, which is provided at one end with an enlargement 16 having an integral spoke flange 17. The enlargement 16 is preferably provided with a cylindrical recess or bore 18 for receiving the ball bearing race 19. The ball bearing race 19 may have a plane end surface 20 and an outer cylindrical surface 21, and is complementary to the recess 18 and has a frictional fit therein.

The ball bearings are preferably of the self-aligning type so that the race 19 is provided with a groove 22 partially circular in cross section, located opposite the juncture of the two surfaces 20, 21 for receiving the balls 23. The race 19 may also have an outer plane surface 24, which terminates short of the end of the recess 18 so that the recess is also adapted to receive an oil seal 25, the outer surface of which is flush with the outer face 26 of the enlargement 16.

The oil seal 25 may consist of a pair of angular annular members 27, 28, housing an annular member 29 of felt. The annular members 27, 28 each have a radially extending flange 30, 31 and a cylindrical flange 32, 33. The radially extending flanges are provided with apertures 34 that have a clearance with respect to the cone race 35.

The cylindrical flange 32 of the annular housing 27 is of sufficient size to have a tight frictional fit in the cylindrical flange 33 of the other annular housing member 28. Thus the two housing members form an annular groove for receiving the felt member 29, which is of complementary cross section, but which has its aperture 36 slightly smaller than the cylindrical surface 37 on the cone 35, which it engages.

The outer cylindrical flange 33 of the oil seal 25 is of such size that it has a tight frictional fit in the cylindrical bore 18 in which it is driven home against the end surface 24 of race 19.

The shaft 13 is provided with the usual threaded end portions 38, 39 for receiving the nuts 40—43. The ball bearing cone 35 consists of a tubular metal member having a non-circular end portion 44 for engagement with a wrench and a cylindrical through bore 45, which is unthreaded and which passes the threaded portion 38.

Its external surface 37 may be cylindrical, but at its inner end it is provided with an annular groove 46 that is preferably curved on a radius substantially larger than that of the balls 23, while the groove 22 is curved on substantially the same radius as that of the balls 23.

The nut 41 holds the cone race member 35 in engagement with the balls 23 under a predetermined pressure when the opposite cone 35 is engaged by the nut 42, and the right cone member 35 engages the balls 23 at this end.

The nuts 41, 42 are locked in place by engagement with the rear forks 11 and the nuts 40, 43.

The opposite end of the tubular member 15 is provided with a radially extending flange 47, which is curved at 48 and provided with an axially extending portion 49 for supporting the spoke flange 50. This provides a recess 51 for housing a portion of the free-wheeling device.

The tubular member 15 is preferably provided with a larger counter-bore 52 at its right end and with a smaller threaded bore 53 for receiving the complementary threaded end 54 of a tubular bearing member 55. The bearing member 55 has an outer cylinder surface 56 fitting in the bore 52 and supplementing the support which is given by the threaded portions 53, 54, and it also has an inner bore 57 which clears the shaft 13.

At its outer end bearing member 55 is provided with a form similar to that of the race 19 in that it has a similar groove 22, a cylindrical outer surface 21, and a plane face 24. In order to drive the tubular member 55 into threaded engagement with the tubular member 15, the bearing member 55 also has the end of its bore 57 formed with a pair of radially extending milled recesses 58. These recesses are deep enough to receive a special wrench by means of which the tubular member 55 is driven home into tight engagement with the member 15.

The bearing member 55 is also formed with a reduced cylindrical portion 59 and an annular shoulder 60 serving to engage the ball bearings 61.

Figure 2:
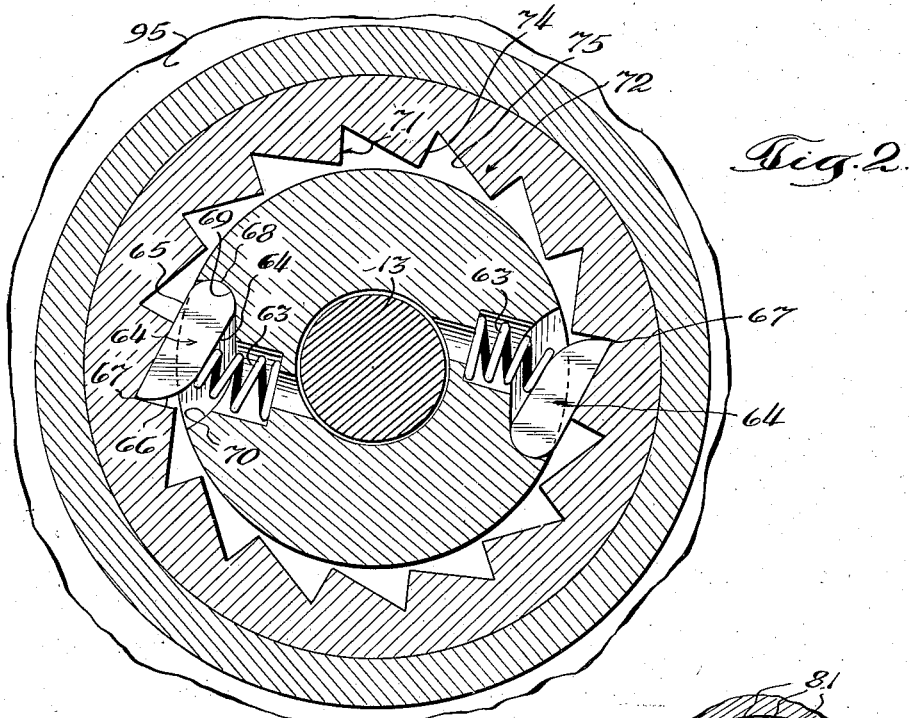
Fig. 2 is a fragmentary sectional view, taken on the plane of the line 2—2 of Fig. 1, looking in the direction of the arrows.
Figure 4:
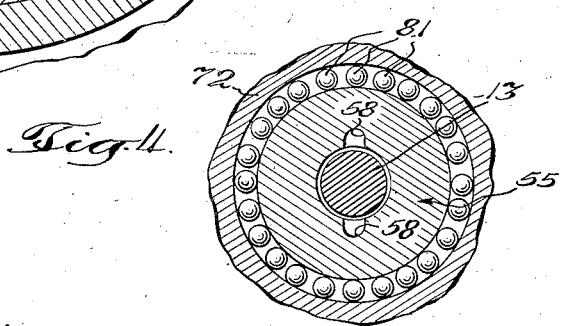
Fig. 4 is a fragmentary sectional view, taken on the plane of the line 4—4 of Fig. 1, looking in the direction of the arrows.

The cylindrical portion 59 is formed with a radial bore 62 for receiving the helical compression spring 63, which engages the pawl 64 (Fig. 2). The pawl 64 may consist of a metal member, such as steel, having a plane outer face 65 and a curved inner surface 66, which tapers to a point 67.

The spring 63 engages its plane inner face 64, and at its end opposite to the point 67 it is provided with a partially cylindrically curved surface 68. The cylindrical surface 68 fits in a complementary recess 69 in the bearing member 55, and the surface 69 is a part of the surface of a recess 70, which is complementary to the inner surface of the pawl 64, so that the pawl is adapted to be received in the member 55 sufficiently to pass the inwardly extending teeth 71 of a ratchet member 72.

The teeth 71 are carried by an inwardly extending flange 73 on the ratchet member 72, and they are provided with the abrupt surfaces or shoulders 74 which extend substantially radially and with the diagonally extending camming surfaces 75, which have their major dimension extending peripherally of the ratchet.

Any number of spring pressed pawls may be used, but they are preferably symmetrically arranged so as to exert a balanced torque, and they are preferably reduced to a minimum which will accomplish this result, such as two, because the friction is increased by the use of each additional pawl.

The ratchet flange 73 is formed at each of its sides with an annular shoulder 76, 77, and each annular surface 76, 77 engages the side of a supplementary race ring 78, 79. The race rings 78, 79 are substantially rectangular in cross section, but are provided on their inner faces, adjacent the ratchet flange 73, with a beveled surface 80 so as to eliminate any possibility of interference with the ratchet.

The opposite surfaces of these race rings 78, 79 engage the balls 61, 81, which form the parts of a ball bearing structure for rotatably supporting the ratchet member 72 on the hub 14. The balls 61 are engaged on the left side (Fig. 1) by another race member 82, which has a substantially cylindrical body provided with a cylindrical surface 83 for engaging the balls 61.

A radial flange 84 has an annular surface 85 serving as a thrust surface for the balls 61, and the race member 82 has a cylindrical bore 86 with a frictional fit on the bearing member 55. At its left end this race member 82 may have a reduced cylindrical portion 87 for engaging a complementary bore in a felt ring 88, which serves as an oil seal for this end of the free-wheeling device.

The felt ring is engaged on its right side by an annular shoulder 89 and on its left side (Fig. 1) by a machined surface 90 on the flange 47. It is retained in place and slightly compressed by the inner cylindrical surface 91 on the ratchet member 72, this cylindrical surface also serving to confine the balls 61.

The length of the ratchet member 72 is sufficient so that it projects beyond the balls 23 sufficiently to provide space for another oil seal 25, which may be similar in structure and similarly mounted with respect to the cone race 35, and ratchet member 72, as described, with respect to the left end of the structure in Fig. 1.

The ratchet member 72 is provided at its left end with a reduced threaded portion 92 for receiving a nut 93 that serves to confine and secure the sprockets at this end. Extending toward the right in Fig. 1 from the threaded portion 92 the external surface 94 of ratchet member 72 is non-circular in form, such as, for example, octagonal or hexagonal.

Figure 3:
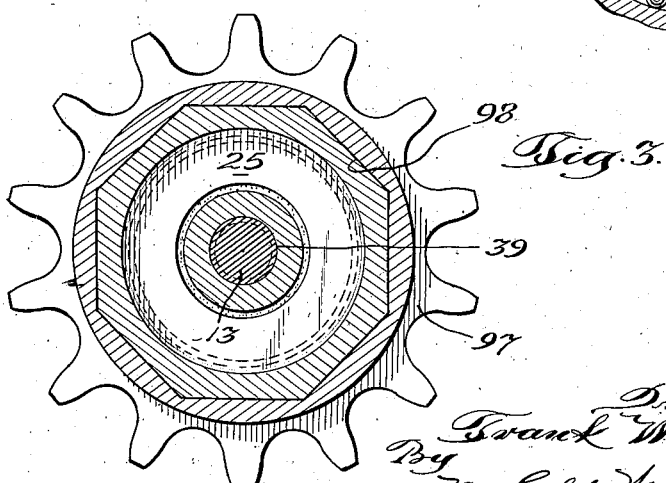
Fig. 3 is another sectional view, taken on the plane of the line 3—3 of Fig. 1, looking in the direction of the arrows.

In Fig. 3 the present embodiment is shown to be octagonal, and the sprockets 95—97 are all provided with the complementary octagonal apertures 98 for receiving this non-circular portion of the ratchet member 72. Spacers 98 are interposed between the nut 93 and the sprocket 95 and between each pair of sprockets, and the right end of the ratchet member 72 has a reduced threaded portion 99 for receiving a nut 100.

The sprockets and spacers are clamped on the ratchet member 72 by means of the nuts 93 and 100, and in every case the direction of the thread used on this member, as well as the threads at 53, 54, is preferably such that when the load is applied to the sprocket by means of a chain, such as the chain 101, the sprocket will continue to tighten itself. In Fig. 1 this requires a right hand thread.

The operation of the present freewheeling device is as follows: By removing the ring nut 100 the sprockets can be readily removed and replaced with sprockets of another size. This overcomes one of the principal difficulties experienced with the freewheeling devices of the prior art. The torque strain on these sprockets is considerable, and would be excessive for the use of a key-way device, which might also require enlargement of the sprockets to provide suitable strength.

All of the parts of the bearing are preferably made of suitable steel, and the ratchet member 72 may be made of octagonal bar steel. When torque is applied to any one of the sprockets to which the chain happens to be attached in a forward or right hand direction, the sprocket drives the ratchet member 72, the shoulders 71 of which engage the pawl or pawls 64, and the wheel is driven forward.

When, however, the pedals are held still and the wheel continues to rotate, due to the momentum or due to the fact that the vehicle is proceeding downhill, the diagonal camming surfaces 75 on the ratchet member cam the pawl 64 inward and permit the wheel to run ahead of the sprockets.

One of the most important advantages of the present invention is that the device can be made more compact than the devices of the prior art so that a small fourteen-toothed sprocket can be used, due to the particular structure and arrangement of the parts, whereas the smallest sprocket that could be used on the devices of the prior art is a sixteen-toothed sprocket.

The present device operates with a minimum amount of friction, and it may be kept suitably lubricated at all times because its oil seal and structure are such as to retain the grease in place and to maintain adequate lubrication.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a bearing structure for cycles or the like, the combination of a hub member comprising a tubular body having a threaded counterbore, a combined race and pawl support having a complementary threaded tubular portion threaded into said hub, said combined race and pawl support being provided with a bore for passing a shaft, a radially extending bore in said combined race and pawl support, a helical spring in said latter bore, and a pawl engaged by said spring, a sprocket supporting member rotatably supported upon said combined race and pawl support, said sprocket supporting member having an external polygonal surface, and a sprocket fixedly mounted upon said latter surface, said sprocket-supporting member having an inwardly extending flange provided with ratchet teeth for engaging said pawl, said latter flange serving as a thrust flange for engaging anti-friction bearing members confined between said combined race and pawl support and said sprocket supporting member.

2. In a bearing structure for cycles or the like, the combination of a hub member comprising a tubular body having a threaded counterbore, a combined race and pawl support having a complementary threaded tubular portion threaded into said hub, said combined race and pawl support being provided with a bore for passing a shaft, a radially extending bore in said combined race and pawl support, a helical spring in said latter bore, and a pawl engaged by said spring, a sprocket supporting member rotatably supported upon said combined race and pawl support, said sprocket supporting member having an external polygonal surface, and a sprocket fixedly mounted upon said latter surface, said sprocket-supporting member having an inwardly extending flange provided with ratchet teeth for engaging said pawl, said sprocket supporting member having a bore and extending outwardly beyond said combined race and pawl support, ball bearings engaging said combined race and pawl support, a second race engaging inside said ball bearings, and a resilient felt oil sealing member carried by said sprocket supporting member and engaging said latter race.

3. In a bearing structure for cycles or the like, the combination of a hub member comprising a tubular body having a threaded counterbore, a combined race and pawl support having a complementary threaded tubular portion threaded into said hub, said combined race and pawl support being provided with a bore for passing a shaft, a radially extending bore in said combined race and pawl support, a helical spring in said latter bore, and a pawl engaged by said spring, a sprocket supporting member rotatably supported upon said combined race and pawl support, said sprocket supporting member having an external polygonal surface, and a sprocket fixedly mounted upon said latter surface, said sprocket-supporting member having an inwardly extending flange provided with ratchet teeth for engaging said pawl, said sprocket supporting member having a bore and extending outwardly beyond said combined race and pawl support, ball bearings engaging said combined race and pawl support, a second race engaging inside said ball bearings, and a resilient felt oil sealing member carried by said sprocket supporting member and engaging said latter race, said felt oil sealing member being confined between two angular annular members which are frictionally engaged with each other and by said sprocket supporting member.

FRANK W. SCHWINN.